E. ATTAWAY.
INSECT CATCHER.
APPLICATION FILED APR. 27, 1909.

940,116.

Patented Nov. 16, 1909.
4 SHEETS—SHEET 1.

E. ATTAWAY.
INSECT CATCHER.
APPLICATION FILED APR. 27, 1909.

940,116.

Patented Nov. 16, 1909.
4 SHEETS—SHEET 2.

Witnesses
Oliver W. Holmes
J. J. Sheehy Jr.

Inventor
E. Attaway
James Sheehy
By
Attorney

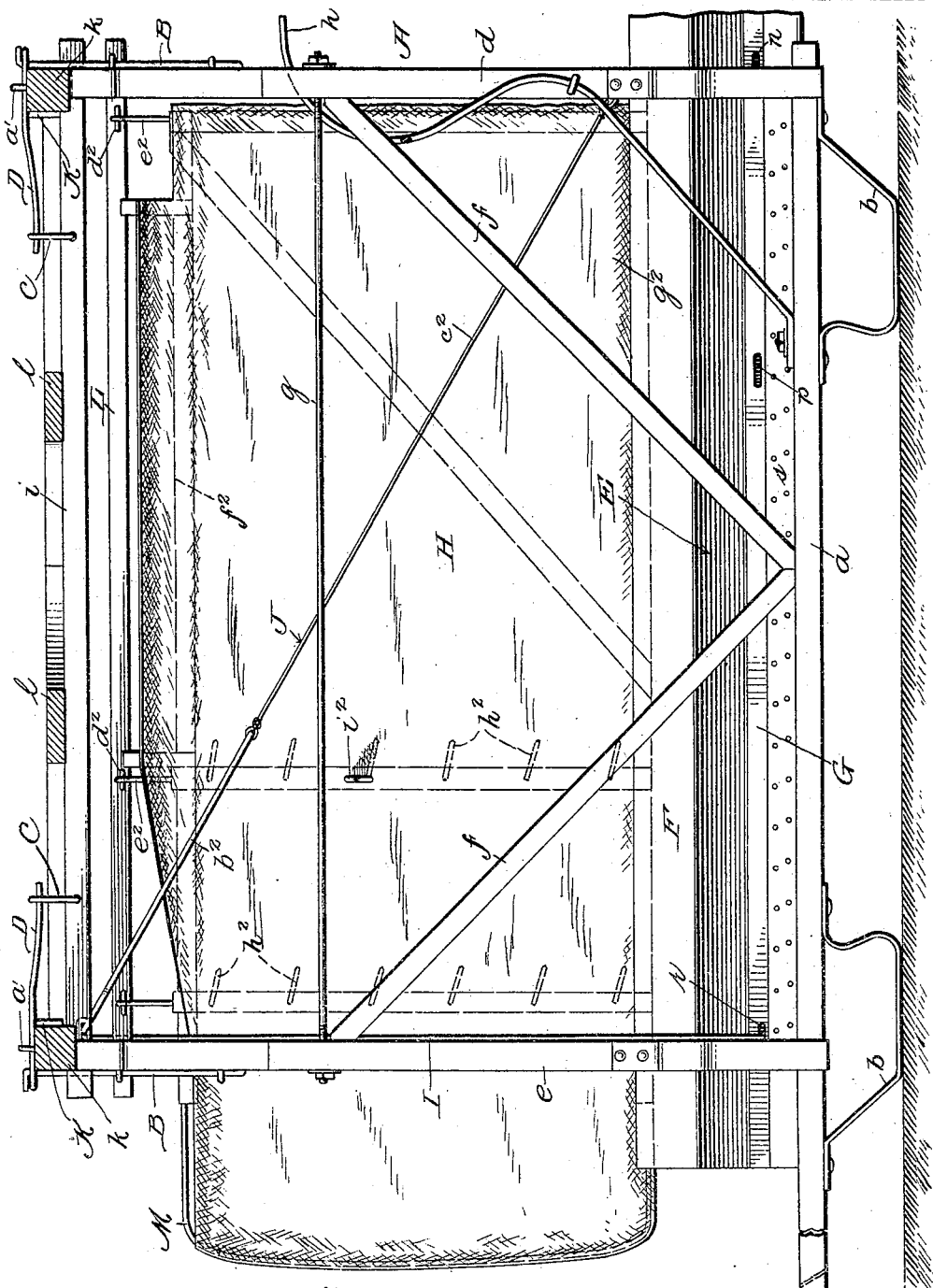

E. ATTAWAY.
INSECT CATCHER.
APPLICATION FILED APR. 27, 1909.
940,116.
Patented Nov. 16, 1909.
4 SHEETS—SHEET 4.
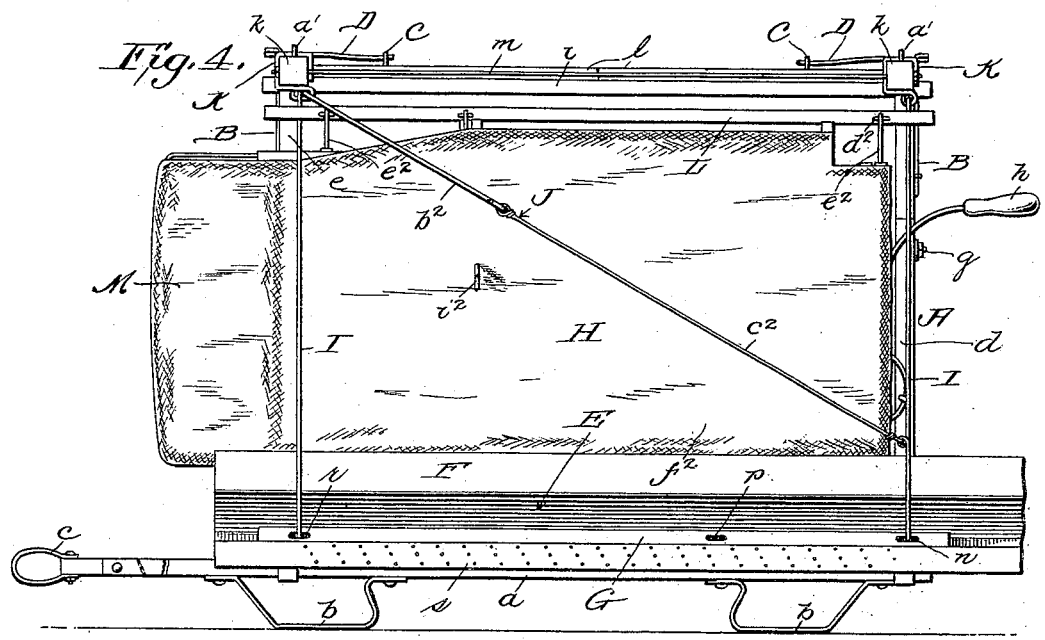
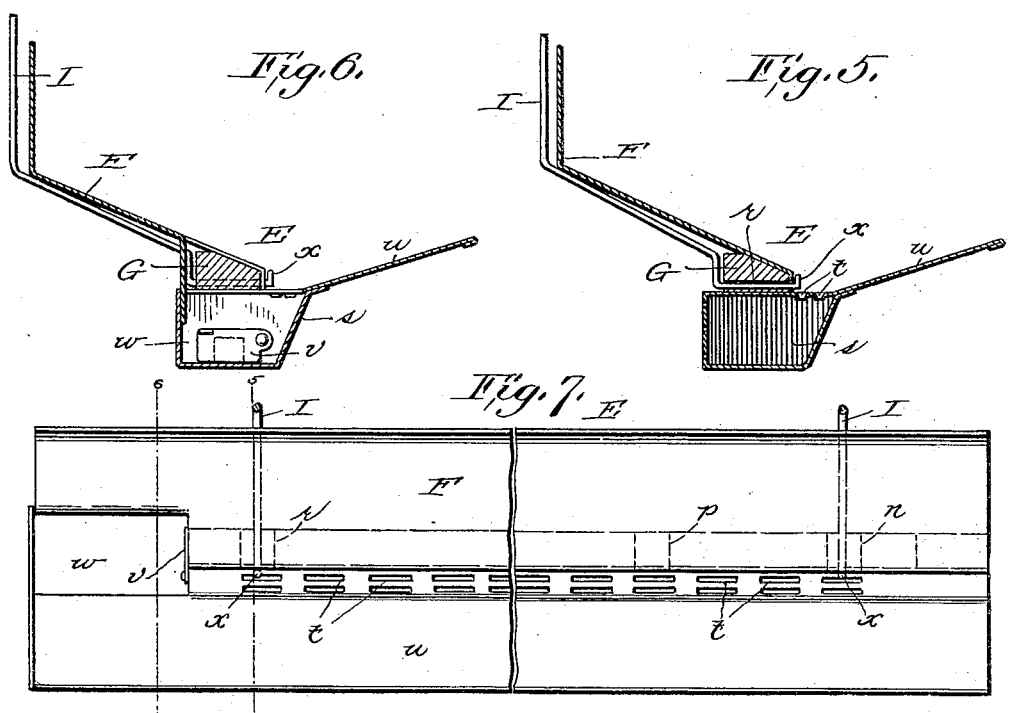
Witnesses
Oliver W. Holmes
J. J. Sheehy Jr.
Inventor
E. Attaway
By James J. Sheehy
Attorney

UNITED STATES PATENT OFFICE.

ELISHA ATTAWAY, OF MORROW, LOUISIANA.

INSECT-CATCHER.

940,116.  Specification of Letters Patent.  Patented Nov. 16, 1909.

Application filed April 27, 1909. Serial No. 492,483.

*To all whom it may concern:*

Be it known that I, ELISHA ATTAWAY, citizen of the United States, residing at Morrow, in the parish of St. Landry and State of Louisiana, have invented new and useful Improvements in Insect-Catchers, of which the following is a specification.

My invention has relation to insect catchers; and it contemplates the provision of an apparatus devised with a view of efficiently clearing cotton plants of boll weevils, and of taking advantage of the instinct of weevils to hide in the ground to trap the same, and the latter in such manner that the weevils may be readily gathered at the end of a suitable period and expeditiously and easily destroyed.

The invention also contemplates the provision of an apparatus for the purpose stated, embodying such a construction that it may be readily disassembled and stored in a small space, and as readily reassembled when it is desired to put it in use.

Figure 1:
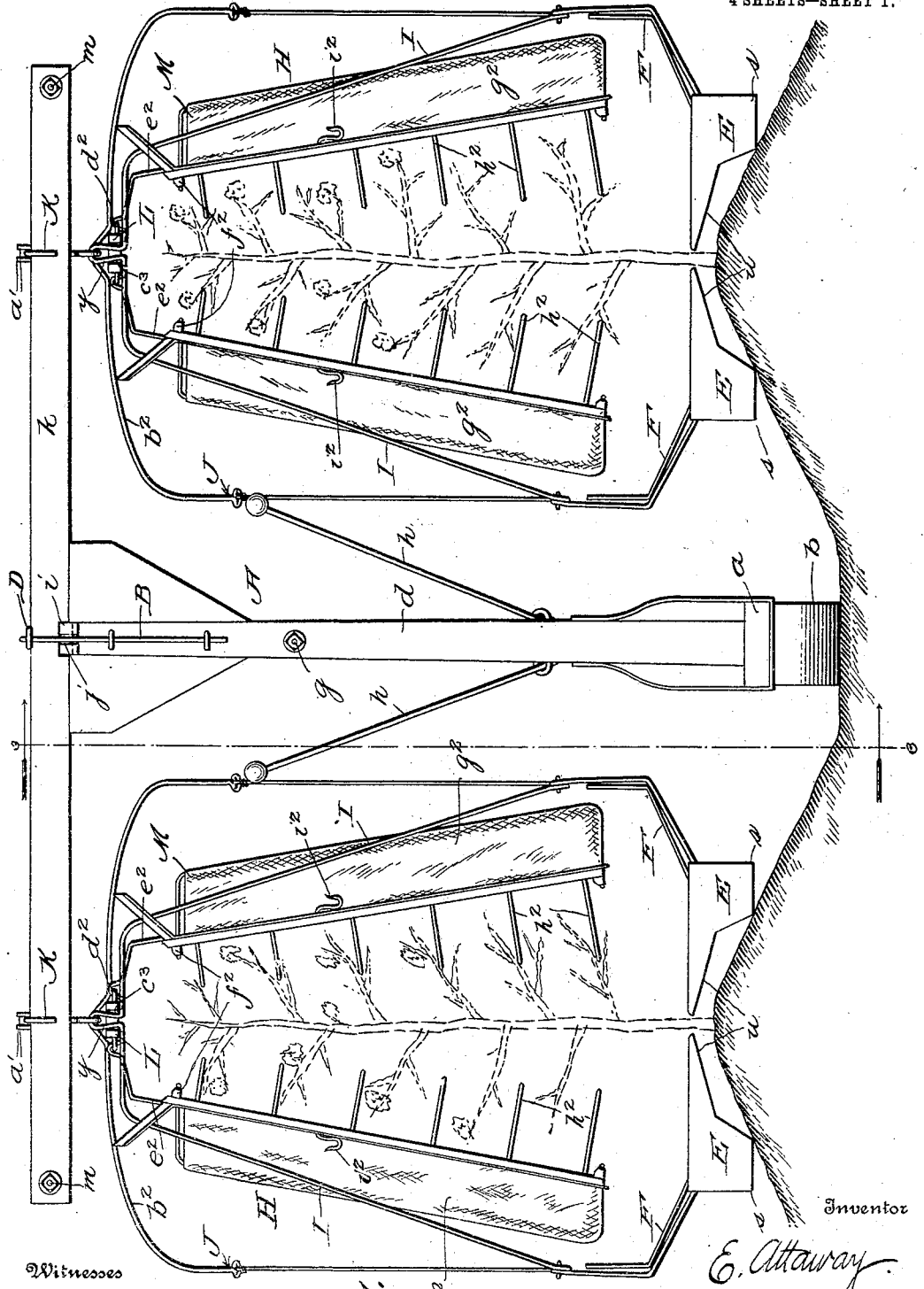
Figure 2:
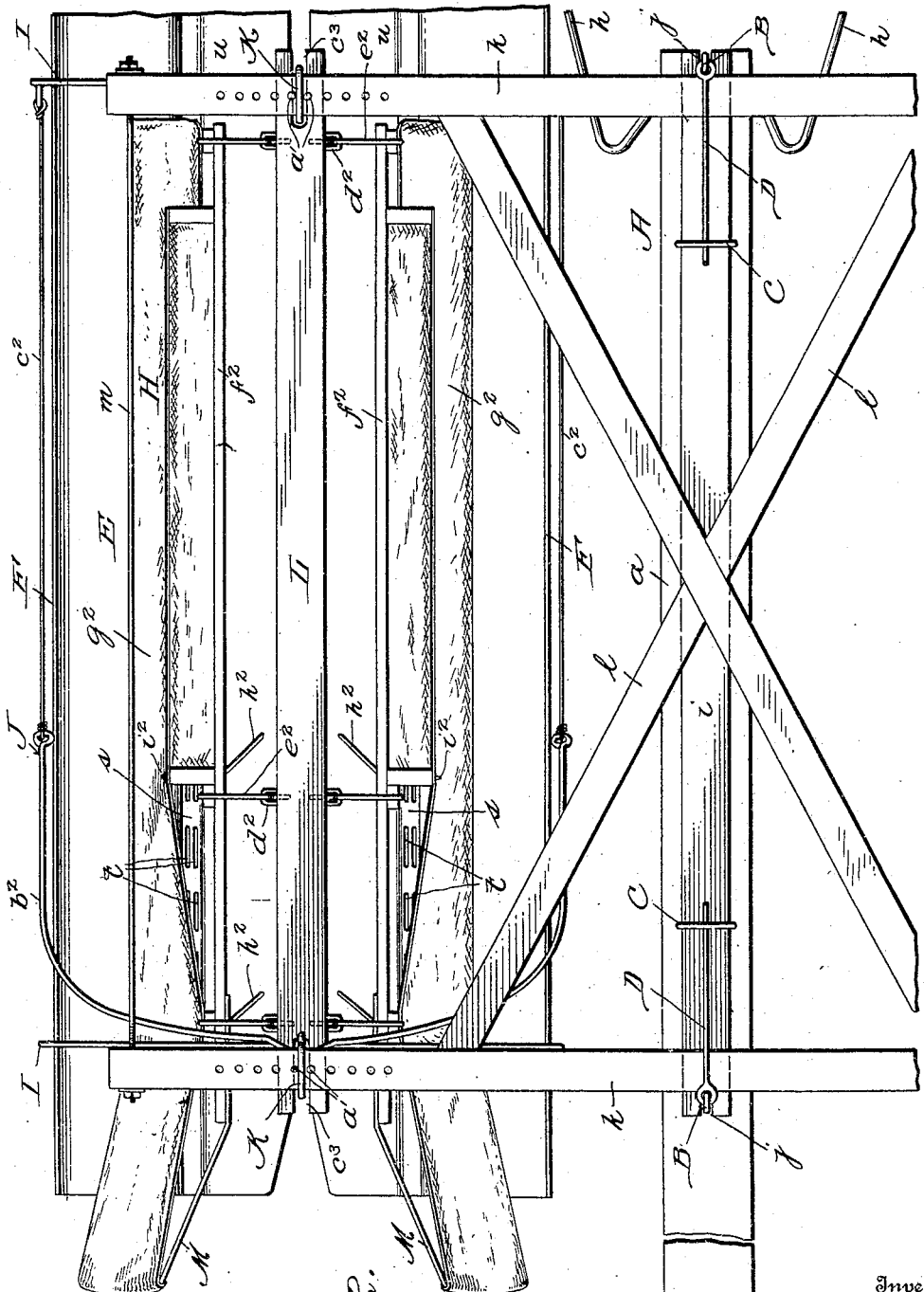

Other advantageous characteristics peculiar to my invention will be fully understood from the following description and claims when the same are read in connection with the drawings, accompanying and forming part of this specification, in which:

Figure 1 is a rear end elevation of the apparatus constituting the best practical embodiment of my invention of which I am cognizant. Fig. 2 is a plan view of the same, showing, however, but one of the catching devices. Fig. 3 is a longitudinal vertical section, taken in the plane indicated by the line 3—3 of Fig. 1, looking in the direction indicated by the arrow. Fig. 4 is a side elevation of the apparatus on a reduced scale. Fig. 5 is an enlarged transverse section taken through one of the traps and its appurtenances in the plane indicated by the line 5—5 of Fig. 7. Fig. 6 is a similar view taken on the line 6—6 of Fig. 7, and: Fig. 7 is a plan view of one of the traps and the appurtenances thereof.

Similar letters designate corresponding parts in all of the views of the drawings, referring to which:

A is the main frame of my novel apparatus. The said frame comprises a longitudinal bar *a* having runners *b*, whereby it is adapted to travel along the ground between rows of cotton plants, Fig. 1, and also having a clevis *c* for the attachment of a draft animal, rear and forward uprights *d* and *e*, fixed to and rising from the bar *a* and having notches in their upper ends, diagonal braces *f* interposed between and fixed to the bar *a* and the uprights *d* and *e*, a longitudinal brace *g*, formed by preference of wire and extending between the uprights, in a plane above the diagonal braces *f*, and handles *h* fixed to the longitudinal bar *a* and the rear upright *d*, and extending rearwardly of the latter so as to rest within convenient reach of the party handling the apparatus.

Superposed on the uprights *d* and *e* of the main frame A is a sub-frame disposed horizontally as shown and extending at opposite sides of the vertical plane of the longitudinal bar *a* and uprights *d* and *e*. The said sub-frame is made up of a longitudinal central bar *i* adapted to be arranged in the notches of the uprights *d* and *e*, and having notches in its underside to receive the bottom walls of the notches in the uprights, and also having notches *j* in its ends, fore and aft cross-bars *k* fixed on the bar *i*, and braces *l* and *m*, arranged as best shown in Fig. 2; the braces *m* being preferably of wire.

B·B are hooks, the shanks of which are fixed to the uprights *d* and *e* and are adapted to rest in the notches *j* of the sub-frame and extend above the bars *k* of said sub-frame.

C C are bail-shaped catches pivoted to the bar *i* of the sub-frame, and D D are links having eyes to receive the hooks B and also having end portions adapted to rest in and be held by the catches C. When the catches C are swung out of engagement with the links D, the eyes of the links may be disengaged from the hooks B, and then the sub-frame as a whole may be lifted off the uprights *d* and *e* of the main frame, this in order to permit of the main frame and the sub-frame being stored side by side in a small space. It will also be mainfest that when it is desired to put the apparatus into use, the sub-frame may be readily superposed on the uprights *d* and *e* of the main frame, and securely connected thereto in a fixed manner by placing the eyes of the links D in engagement with the hooks B, and arranging the inner ends of the links in the catches C.

Carried by the horizontal sub-frame and arranged longitudinally of the apparatus and at opposite sides of the main frame A so as to simultaneously act on two parallel rows of cotton plants, after the manner illustrated in Fig. 1, are the two devices for clearing plants of boll weevils, and trapping the boll weevils when the same fall from the plants. The said devices and their appurtenances are identical in construction and therefore a detailed description of the one shown at the right of Figs. 1 and 2 and in Figs. 3 to 7, will suffice to impart a definite understanding of both. The stipulated device will, by reference to the figures and portions of figures mentioned, be understood as comprising traps E arranged longitudinally at opposite sides of a row of cotton plants, receiving plates F, preferably of sheet-metal, extending upwardly and outwardly, with reference to the traps, and corresponding in length to the latter, strips G, preferably of wood, interposed between and fixedly connected to the inner portions of the receiving plates F and the outer portions of the traps E, and each having two oblong apertures $n$ and $p$ in its rear portion and a similar aperture $r$ in its forward portion, agitators H arranged above the receiving plates F and connected with the horizontal sub-frame, hangers I connected with the traps and the horizontal sub-frame, and a connection J intermediate the rear hanger I and the forward portion of the sub-frame. Each of the traps E has a hollow body $s$ in the upper wall of which is a plurality of apertures $t$ and from which extends an inwardly and upwardly directed flange $u$. The outer side wall of the trap body $s$ is preferably foraminous, as shown, in order to admit light to the interior of the body, and in the rear end wall of the hollow body is an opening controlled by a gate $v$ and designed to enable the operator of the apparatus to dump the collected boll weevils from the hollow body into a rear receptacle $w$ carried by the trap and arranged in the rear portion thereof. When massed in the said receptacles $w$ of the traps E, the weevils may obviously be destroyed with ease and despatch. I would also have it understood that while the weevils will pass downwardly through the openings $t$, and into the trap bodies, they cannot pass upwardly through said apertures and in that way escape. This latter is due to the fact that surrounding the openings $t$ are depending portions of metal, Fig. 5, formed when the openings $t$ are punched in the top walls of the trap bodies $s$. The ends of the hangers I, which are preferably of wire, are shaped as shown, that is to say, they are adapted to pass through the oblong apertures in the wood strips G, and then be turned so that their angularly disposed terminals $x$ are directed upwardly. This will preclude casual disconnection of the strips G and traps E from the hangers, and yet by arranging the hangers in positions at right angles to those illustrated, the angular terminals $x$ of the hangers may be drawn outwardly through the oblong apertures in the strips G, this when the apparatus is to be disassembled. I would also have it understood at this point that by placing the end portions of the rear hanger I in the apertures $p$ instead of the rear apertures $n$, the traps can be held in a raised position, this in order to meet different conditions. At their upper ends the hangers I are looped, as indicated by $y$, and the said loops $y$ are connected to hooks K which rest on and are adapted to be adjusted laterally on the bars $k$ of the sub-frame. The lateral adjustment of the hooks K on the transverse bars $k$ permits of the device being arranged at different distances from the upright portion of the main frame A, and I would have it understood that any suitable means such as pins $a'$ may be employed for adjustably fixing the hooks K at the desired points on the bars $k$. Because of the adjustability of the hooks K, the devices at opposite sides of the main frame A may obviously be accommodated to rows of cotton plants disposed at different distances apart.

The receiving plates F, as implied by their name, have for their purpose to receive the weevils that drop from the plants, and to deflect the weevils to the top walls of the trap bodies. It is well known to those versed in the traits of boll weevils that when disturbed or agitated they drop to the ground and seek holes in which to hide temporarily. My improved apparatus takes advantage of this instinct of the insects, for it will be readily understood that when they are deposited by the plates F on the tops of the traps, they will immediately pass through the openings $t$ of the traps.

The connection J hereinbefore referred to, comprises a yoke $b^2$, preferably of wire, connected to the forward hook K, and cables $c^2$ interposed between and connecting the ends of the yoke and the depending portions of the rear hanger I. The said connection serves in the event of the traps E striking an obstruction, to pull the traps ahead and prevent lagging thereof. It will also be noted that because of the connection J the traps do not tend to climb up on the cotton plants, and when the traps encounter cotton plants a little out of line in the row, the hangers I will spring outwardly, and the connection J will cause the traps to properly pass at opposite sides of such plants.

L is a longitudinal bar, preferably of wood, having its ends notched, as indicated by $c^3$, so as to straddle the loops $y$ of the hangers I and bear on the upper portions of the said hangers. At opposite sides and at intermediate points of its length, the said bar L is provided with staples $d^2$. With these staples $d^2$ are detachably connected the inner ends of links $e^2$, fixedly connected with the wood framework $f^2$ of each agitator H. In addition to the said framework $f^2$ and links $e^2$, the agitators H respectively comprise a shield $g^2$, of textile or other suitable material, arranged at and connected to the outer side of the frame, and having for its office to prevent weevils escaping laterally from the device, and tangs $h^2$ extending inwardly and slightly rearwardly from the uprights of the frame $f^2$ and designed to pass into and through the spaces between the branches of the cotton plants with a view of disturbing the branches and the boll weevils and to cause the weevils to drop from the plants. When desired the agitators H may be provided with hooks $i^2$ on the outer sides of their shields $g^2$; the said hooks being designed when the cotton is large to receive weights (not shown), which weights are employed on the agitators when the cotton is large, in order to prevent undue outward movement of the agitators or, in other words, to hold the same yieldingly to their work. The tangs $h^2$ are directed or inclined rearwardly, as before stated, in order to lessen the liability of the said tangs catching into and injuring the plants. At this point attention is directed to the fact that the bars L of the devices at opposite sides of the main frame A are adapted to be readily disconnected from the loops $y$ of the hangers I; also that the hangers I and the hooks K may be readily disconnected from the horizontal sub-frame, and the agitators H may be readily disconnected from the bars L, all in order that when not in use the apparatus in its disassembled state may be packed in a small space for storage or shipment.

Deflectors M, Fig. 2, may, when deemed expedient, be connected to the forward ends of the agitator frames $f^2$ and the forward ends of the shields $g^2$, so as to facilitate the passage of the agitators H at opposite sides of a plant.

It is thought that the operation of my novel apparatus will be fully understood from the foregoing, and therefore it is deemed unnecessary to reiterate the same except to say that the main frame A is drawn between two rows of cotton plants, and is properly held and guided *en route*, while the devices suspended from the horizontal sub-frame are simultaneously acting upon plants in rows at opposite sides of the main frame A in the manner and for the purpose described.

In addition to the practical advantages hereinbefore ascribed to my novel apparatus, it will be noted that the apparatus as a whole is simple and inexpensive in construction and is well adapted to withstand the usage to which apparatus of corresponding character is ordinarily subjected.

As before stated, the construction herein illustrated and described constitutes the best practical embodiment of my invention that I have up to this time devised, but it is obvious that in the future practice of the invention changes in the form, construction and relative arrangement of parts may be made without affecting my invention, provided such changes do not involve departures from the scope of my invention as defined in the claims appended.

Having described my invention, what I claim and desire to secure by Letters-Patent, is:

1. The combination in an insect catcher, of carrying means movable above a row of plants, agitators connected with and arranged below the carrying means and movable through portions of the plants at opposite sides of the row, traps disposed below the said agitators and having inwardly and upwardly extending flanges, receiving plates connected to and extending outwardly and upwardly relative to the traps, portions interposed between the traps and the receiving plates and having transversely disposed oblong apertures, and hangers detachably connected with the carrying means and having portions extending through the said oblong apertures and terminating in angularly disposed portions which in one position of the hangers are adapted to be withdrawn through the oblong apertures.

2. An insect catching apparatus comprising a main frame movable longitudinally between two rows of plants, a sub-frame superposed on the main frame and adapted to overhang the rows of plants, and catching devices each connected with and depending from an overhanging portion of the sub-frame and respectively comprising agitators, and traps disposed below the agitators.

3. An insect catching apparatus comprising a main frame movable longitudinally between two rows of plants, a sub-frame superposed on and detachably connected with the main frame and adapted to overhang the rows of plants, hangers detachably connected with the overhanging portions of the sub-frame, longitudinal bars supported by and detachably connected with the hangers, agitators detachably connected with and depending from the said longitudinal bars and adapted to move at opposite sides of the rows of plants and having means movable through portions of the plants, and traps disposed below the agitators and detachably connected with the hangers.

4. An insect catching apparatus comprising a main frame movable longitudinally between two rows of plants, a sub-frame superposed on and detachably connected with the main frame and adapted to overhang the rows of plants, fore and aft hangers detachably connected with the overhanging portions of the sub-frame, longitudinal bars supported by and detachably connected with the fore and aft hangers, agitators detachably connected with and depending from the said longitudinal bars and adapted to move at opposite sides of the rows of plants and having means movable through portions of the plants and also having shields arranged outside said means, traps disposed below the agitators and detachably connected with the hangers and having inwardly and upwardly inclined flanges, receiving plates connected to and extending outwardly from the traps and resting on the hangers, and a connection between the forward portions of the sub-frame and the rear hangers.

5. The combination of two opposed frame portions interlocked with each other; one of said frame portions having a bifurcated end extending beyond the other frame portion, a pivoted bail-shaped catch on said bifurcated frame portion, a hook connected to the other frame portion and adapted to extend through the said bifurcation, and a removable link having an eye removably arranged on the hook and adapted to be removably secured in the bail-shaped catch.

In testimony whereof I have hereunto set my hand in presence of two subscribing witnesses.

ELISHA ATTAWAY.

Witnesses:
 CHARLIE NEAL,
 L. R. BLUM.